(12) United States Patent
Zhang et al.

(10) Patent No.: US 7,657,019 B2
(45) Date of Patent: Feb. 2, 2010

(54) SYSTEM FOR AND METHOD OF HAIRPINNING A REMOTE PBX OR KTS OR GATEWAY PHONE CALL TO A LOCAL CALL

(75) Inventors: Zhi Zhang, Calgary (CA); Xinyu Lu, Calgary (CA); Ky Xuong Nguy, Calgary (CA); David Michael Milne, Calgary (CA); Todd Alan Turner, Calgary (CA)

(73) Assignee: Tortel USA, LLC, Amherst, NY (US)

( * ) Notice: Subject to any disclaimer, the term of this patent is extended or adjusted under 35 U.S.C. 154(b) by 563 days.

(21) Appl. No.: 10/199,178

(22) Filed: Jul. 19, 2002

(65) Prior Publication Data

US 2004/0013259 A1     Jan. 22, 2004

(51) Int. Cl.
*H04M 7/00* (2006.01)
(52) U.S. Cl. .................. 379/229; 379/219; 379/220.01; 379/225; 379/235
(58) Field of Classification Search ............... 379/229, 379/225, 221.05, 219, 235, 220.01, 231, 379/234; 370/352; 455/7, 406; 725/78; 714/18; 709/233; 705/1; 706/14
See application file for complete search history.

(56) References Cited

U.S. PATENT DOCUMENTS

| | | | |
|---|---|---|---|
| 5,432,845 A | 7/1995 | Burd et al. | |
| 5,594,727 A | 1/1997 | Kolbenson et al. | |
| 5,761,277 A * | 6/1998 | Foladare et al. | 379/221.05 |
| 5,918,002 A * | 6/1999 | Klemets et al. | 714/18 |
| 5,953,400 A | 9/1999 | Rosenthal et al. | |
| 6,192,399 B1 * | 2/2001 | Goodman | 725/78 |
| 6,272,215 B1 * | 8/2001 | Cockrell et al. | 379/219 |
| 6,282,192 B1 * | 8/2001 | Murphy et al. | 370/352 |
| 6,292,834 B1 * | 9/2001 | Ravi et al. | 709/233 |
| 6,363,065 B1 | 3/2002 | Thornton et al. | |
| 6,374,078 B1 * | 4/2002 | Williams et al. | 455/7 |
| 6,389,279 B1 | 5/2002 | Calabrese et al. | |
| 6,526,273 B1 * | 2/2003 | Link et al. | 455/406 |
| 6,542,499 B1 * | 4/2003 | Murphy et al. | 370/352 |
| 6,628,776 B1 * | 9/2003 | Lee | 379/225 |
| 6,876,987 B2 * | 4/2005 | Bahler et al. | 706/14 |
| 6,944,150 B1 * | 9/2005 | McConnell et al. | 370/352 |
| 2002/0103656 A1 * | 8/2002 | Bahler et al. | 705/1 |

OTHER PUBLICATIONS

International Search Report PCT/US03/21557, Submitted on Jul. 19, 2002.

* cited by examiner

*Primary Examiner*—Thjuan K Addy
(74) *Attorney, Agent, or Firm*—McDermott Will & Emery LLP

(57) ABSTRACT

In a system having a switching device in a first location, and an extending device in a second location, a method of providing a communications link between (i) a first phone associated with the extending device and (ii) a second phone local to the second location and not associated with the extending device includes analyzing parameters associated with the first phone and the second phone so as to determine that the first phone and the second phone are local to the second location. The method further includes separating signaling data associated with the communications link from voice traffic associated with the communications link. The method further includes directing the signaling data through the switching device via an extension link between the switching device and the extending device, and directing the voice traffic between the first phone and the second phone.

28 Claims, 6 Drawing Sheets

SYSTEM FOR AND METHOD OF HAIRPINNING A REMOTE PBX OR KTS OR GATEWAY PHONE CALL TO A LOCAL CALL

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

BACKGROUND OF THE INVENTION

The present invention relates to telephone switching systems, and more particularly, to conserving channel bandwidth in a communications link between a primary office and a remote location.

The majority of in-house telephone systems (e.g., PBX) in use today employ physical telephone units (referred to herein as "desksets") that are wired into a switching device. The switching device, in conjunction with various processing components, provides a wide range of facilities and features to the deskset user. Such facilities and features include voicemail, call transfer, and conferencing, among others. The deskset is a user interface device that is typically comprised of a microphone/speaker, standardized telephone keypad, feature keys, text display, and other visual displays (e.g., lamps or LEDs), and is used primarily to receive and place telephone calls. The deskset employs a fixed and proprietary protocol for communicating with the switching device. Such protocols are typically restricted by the characteristics of the wire (i.e., the transmission path) that connects the deskset to the switching device.

Because the cost to acquire and maintain the switching device can be significant, many organizations choose to install a central switching device in a primary office, and allow users resident in remote offices to access the central switching device via extender links over the Public Switched Telephone Network (PSTN). This arrangement, however, can lead to unfortunate situations that consume unnecessary channel bandwidth in the extender link between the central and remote locations. For example, FIG. 1 shows a central office in city X with a PBX switch 10, and a remote office in city Y. The remote office in city Y utilizes the PBX 10 at the central office in city X through an extender 12 that communicates with a gateway 14 at the central office via an extender link 16 that exists, at least partially, within the PSTN. Suppose an outside phone 18 calls the direct inward dialing (DID) number associated with a user phone 20 in the remote office. The extender 12 will detect the incoming call and route the call to the PBX 10 via the gateway 14 and the extender link 16. The PBX 10 detects the incoming call and determines that it is for the user phone 20 at the remote office. The PBX 10 routes the call to the user phone 20 via the gateway 14, the extender link 16 and the extender 12. Note that channel bandwidth needed to be reserved on the extender link twice; once when the extender 12 routes the call to the PBX 10, and once when the PBX 10 routes the call back to the user phone 20. The bandwidth reserved on the extender link 16 is necessary only because the PBX 10 is located in a city different from the source and destination of the call.

The same path, only in reverse, occurs when the user 20 phone calls the outside phone 18. Further, since a call (in either direction) must traverse so many paths from city to city, the likelihood that at least one of the paths will be disrupted, thus disrupting the call) is greater than if the call remained completely in city Y.

SUMMARY OF THE INVENTION

As used herein, the term "hair-pinning" is the routing mechanism of voice calls at a remote office to a) save bandwidth, b) provide the least-cost voice routing for two calling parties involving an extended PBX user and a non-PBX user, or two extended PBX users c) and provide survivability. The system also provides Toll Bypass functionality to users directly connected to the PBX via a trunk extension.

The invention achieves the three objects above by intelligently turning on or turning off hair-pinned voice paths at a remote location, while still providing access to extended PBX features. The call signaling data is still exchanged between the remote office and the main office (with PBX) for a local call, but the least-cost voice path is dynamically chosen depending on a feature an extended PBX user selects. If the extended user chooses making or receiving a local call that doesn't require voice path to the PBX, the least-cost voice path (called hairpin voice path) is established directly between the local user and remote office, which bypasses the WAN or IP links between the remote office and the main PBX switch site. If the user tries to use a PBX feature (i.e., transfer the call) that would require the voice to be routed through the PBX, the invention disables hair-pinning and routes the voice back to the PBX. The invention manages bandwidth utilization on the extender WAN or IP link, and if bandwidth is unavailable when the user tries to use a PBX feature, the call remains hair-pinned and the PBX feature is denied.

The invention also provides the extension of a PBX trunk interface to a remote site, allowing a Primary Rate Interface (PRI) at the remote site to appear as if it is directly connected to the PBX. Users at both the remote site and users directly connected to the PBX may use this extended trunk for Toll Bypass calls. Users at the remote site who make use of this local trunk interface can be hair-pinned to with the local trunk, thus conserving the bandwidth which would have normally been utilized to send the voice call to the PBX and back.

In one aspect, in a system having a switching device in a first location, and an extending device in a second location such that the extending device extends functionality of the switching device to the second location, the invention comprises a method of providing a communications link between (i) a first phone associated with the extending device and (ii) a second phone local to the second location and not associated with the extending device. The method includes analyzing parameters associated with the first phone and the second phone so as to determine that the first phone and the second phone are local to the second location. The method further includes separating signaling data associated with the communications link from voice traffic associated with the communications link. The method further includes directing the signaling data through the switching device via an extension link between the switching device and the extending device, and directing the voice traffic between the first phone and the second phone. The novelty of this method is that it works in a heterogeneous environment in which a) the switching device doesn't support the voice hairpin concept, b) the extending device interfaces with the switching device—a non-open system on one side and interfaces with a open PSTN on the other side, and c) calls can be originated from different sources with no extra call signal/control information required other than called number to make the method work.

Another embodiment further includes monitoring the communications link to determine if one or more features provided by the switching device are required, and directing the voice traffic through the switching device if the features provided by the switching device are required.

Another embodiment further includes monitoring bandwidth available in the communications link, and preventing the voice traffic from being directed to the switching device if an amount of available bandwidth in the communications link is below a predetermined value.

Another embodiment further includes maintaining the voice traffic between the first phone and the second phone if the signaling data through the switching device is disrupted.

Another embodiment further includes managing bandwidth within the extension link between the switching device and the extending device by dividing the extension link bandwidth into distinct partitions.

Another embodiment further includes dividing each of the distinct partitions into three distinct pools. One pool includes a free pool, characterized an amount of free bandwidth available in the partition. Another pool includes a used pool, characterized by an amount of bandwidth actually used in the partition. Another pool includes an idle pool, characterized by an amount of bandwidth allocated but not used within the partition.

Another embodiment further includes dynamically determining a least-cost path for the voice traffic, and selectively directing the voice traffic to the least-cost path.

Another embodiment further includes providing a trunk interface extension from the switching device to the extending device such that either (i) the first phone, (ii) a third phone associated with the switching device, or (iii) both the first and third phone use the trunk interface extension to place a call to the second phone.

Another embodiment further includes providing a trunk interface extension from the switching device to the extending device such that either (i) the first phone, (ii) a third phone associated with the switching device, or (iii) both the first phone and the third phone use the trunk interface extension to receive a call from the second phone.

In another aspect, the invention comprises a system for hair-pinning voice traffic from a first phone to a second phone within a first region over a communications link via an extending device in the first region. The extending device extends functionality of a switching device in a second region. The system includes a processor for analyzing parameters associated with the first phone and the second phone so as to determine that the first phone and the second phone are local to the second location. In one embodiment, the processor implements a unique voice matching pair algorithm that determines whether the first phone and the second phone are a pair for the intended call. The system also includes a splitter for separating signaling data associated with the communications link from voice traffic associated with the communications link. The system also includes a multiplexor for directing the signaling data through the switching device via an extension link between the switching device and the extending device, and directing the voice traffic between the first phone and the second phone.

In another embodiment, the processor monitors the communications link to determine if one or more features provided by the switching device are required, and directs the voice traffic through the switching device if the features provided by the switching device are required.

In another embodiment, the processor monitors bandwidth available in the communications link, and prevents the voice traffic from being directed to the switching device if an amount of available bandwidth in the communications link is below a predetermined value.

In another embodiment, the processor maintains the voice traffic between the first phone and the second phone if the signaling data through the switching device is disrupted.

In another embodiment, the processor manages bandwidth within the extension link between the switching device and the extending device by dividing the extension link bandwidth into distinct partitions.

In another embodiment, the processor divides each of the distinct partitions into three distinct pools. One pool includes a free pool characterized an amount of free bandwidth available in the partition. Another pool includes a used pool characterized by an amount of bandwidth actually used in the partition. Yet another pool includes an idle pool characterized by an amount of bandwidth allocated but not used within the partition.

In another embodiment, the processor dynamically determines a least-cost path for the voice traffic, and selectively directs the voice traffic to the least-cost path.

Another embodiment further includes a trunk interface extension from the switching device to the extending device wherein either (i) the first phone, (ii) a third phone associated with the switching device, or (iii) both the first and third phone uses the trunk interface extension to place a call to the second phone.

Another embodiment further includes a trunk interface extension from the switching device to the extending device wherein either (i) the first phone, (ii) a third phone associated with the switching device, or (iii) both the first phone and the third phone uses the trunk interface extension to receive a call from the second phone.

In another aspect, the invention comprises a system for transmitting voice traffic from a first phone within a first region to a second phone within the first region via a communications link. The system includes a switching device resident in a second region remote from the first region, wherein the switching device provides one or more communications features related to telephone communications. The system also includes an extending device resident in the first region, local to and electrically coupled to the first phone, wherein the extending device communicates with the switching device via an extension link and extends functionality of the switching device such that the communications features are available in the first region. The extending device (i) analyzes parameters associated with the first phone and the second phone so as to determine that the first phone and the second phone are local to the second location, and they are a pair for the intended call, (ii) separates signaling data associated with the communications link from voice traffic associated with the communications link, and (iii) directs the signaling data through the switching device via an extension link between the switching device and the extending device, and directs the voice traffic between the first phone and the second phone.

In another embodiment, the switching device includes a PBX switching system.

In another embodiment, the extension link includes one or more communications channels through the public switch telephone network.

In another embodiment, the one or more communications features includes PBX functions and features.

In another embodiment, wherein the PBX functions and features include call forwarding, call waiting, voicemail, call transfer, conferencing or combinations thereof.

In another embodiment, the system uses a flow control mechanism such as Adaptive Frame Length Control (AFLC) to solve mis-matched packet transmit and receive rate problem when a packetizing/unpacketizing device (e.g., QMC—a Motorola QUICC multichannel controller) is deployed to packetize/unpacketize raw PCM voice from/to T1/PRI/E1 interface. The novelty of the AFLC is that it works in a deployment in which two packetizing/unpacketizing devices to be sync up are separated by a packetized network (e.g., IP); there is no physical sync control mechanism available between the two devices; and c) two devices are general-purpose IO control devices (e.g., not ASIC/FPGA/DSP which are specifically engineered for packetized voice applications). The uniqueness of the mechanism is also with its low-overhead, simplicity, and easy implementation in software.

BRIEF DESCRIPTION OF DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENTS

Figure 2:
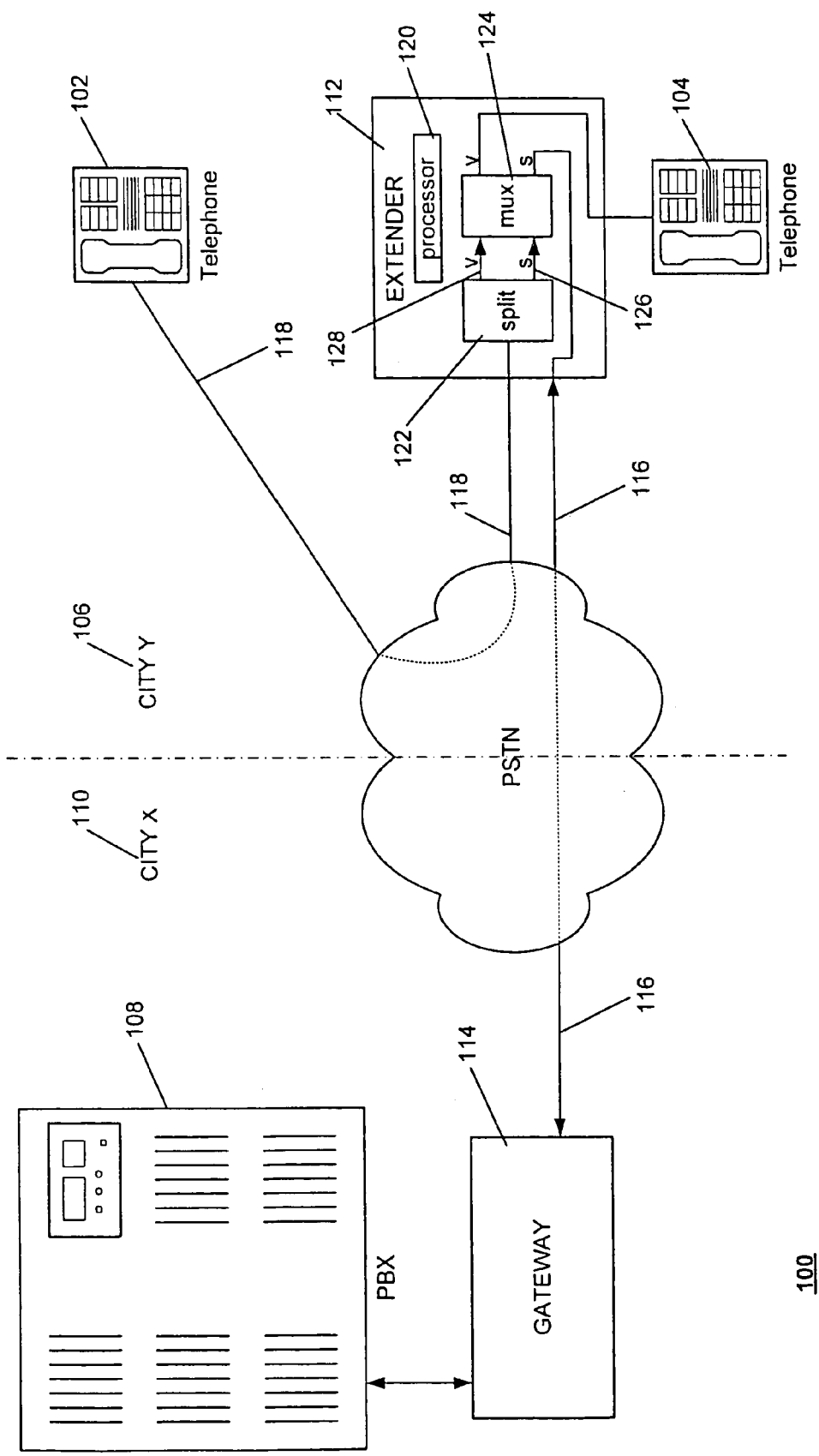
FIG. 2 shows a block diagram view of a system for hair-pinning voice traffic from a first phone to a second phone that are both situated within a first region.

FIG. 2 shows a block diagram view of one preferred embodiment of a system 100 for hair-pinning voice traffic from a first phone 102 to a second phone 104 that are both situated within a first region 106. The system includes a switching device 108 located in a second region 110, and an extending device 112 (also referred to herein as "extender") that extends the facilities and features of the switching device 108 into the second region 106. The extending device 112 communicates with the switching device 108 via a gateway 114 located at or near the switching device 108, through an extending link 116 that exists, at least partially, within the PSTN. In one embodiment, the switching device 108 includes a PBX switch, although other embodiments may use other types of switching devices known in the art. The hair-pinning occurs over a communications link 118 that passes through the extending device 112. The system includes a processor 120 that analyzes parameters associated with the first phone 102 and the second phone 104 to determine the relative locations of the first and second phones. The processor 120 then allows hair-pinning to occur only if the first and second phones are local to the first region 110 and they are a pair for the intended call based on the voice matching pair algorithm described herein. Note that the "first region" may be any predetermined physical space. For example, the first region may include a city, a neighborhood, a building, a country, or any other region that can be spatially delimited in some way. In the embodiment shown in FIG. 2, the processor 120 resides in the extender device 112, although in other embodiments the processor may reside in a separate, independent location, or in some other location that allows access to the parameters necessary for determining the locations of the first and second phones. The communications link 118 that connects the first phone 102 to the second phone 104 consists of bi-directional voice traffic generated by the users of the two phones, as well as lower rate signaling data that accompanies the voice traffic and provides control and other functions. The system also includes a splitter 122 and a multiplexor 124. The splitter 122 separates signaling data 126 associated with the communications link 118 from voice traffic 128 associated with the communications link 118 to generate two separate streams of information. The multiplexor 124 receives the separated streams of information and directs the signaling data 126 through the switching device 108 via the extension link 116 between the switching device 108 and the extending device 112. The multiplexor 124 also directs the voice traffic 128 to pass directly between the first phone 102 and the second phone 104. For simplicity in FIG. 2, only the information passing from the first phone 102 to the second phone 104 is shown. It is understood that the communications between the first phone 102 and the second phone 104 is bi-directional, so that the splitter 122 and the multiplexor 124 also perform similar functions for the data passing from the second phone 104 to the first phone 102.

Figure 1:
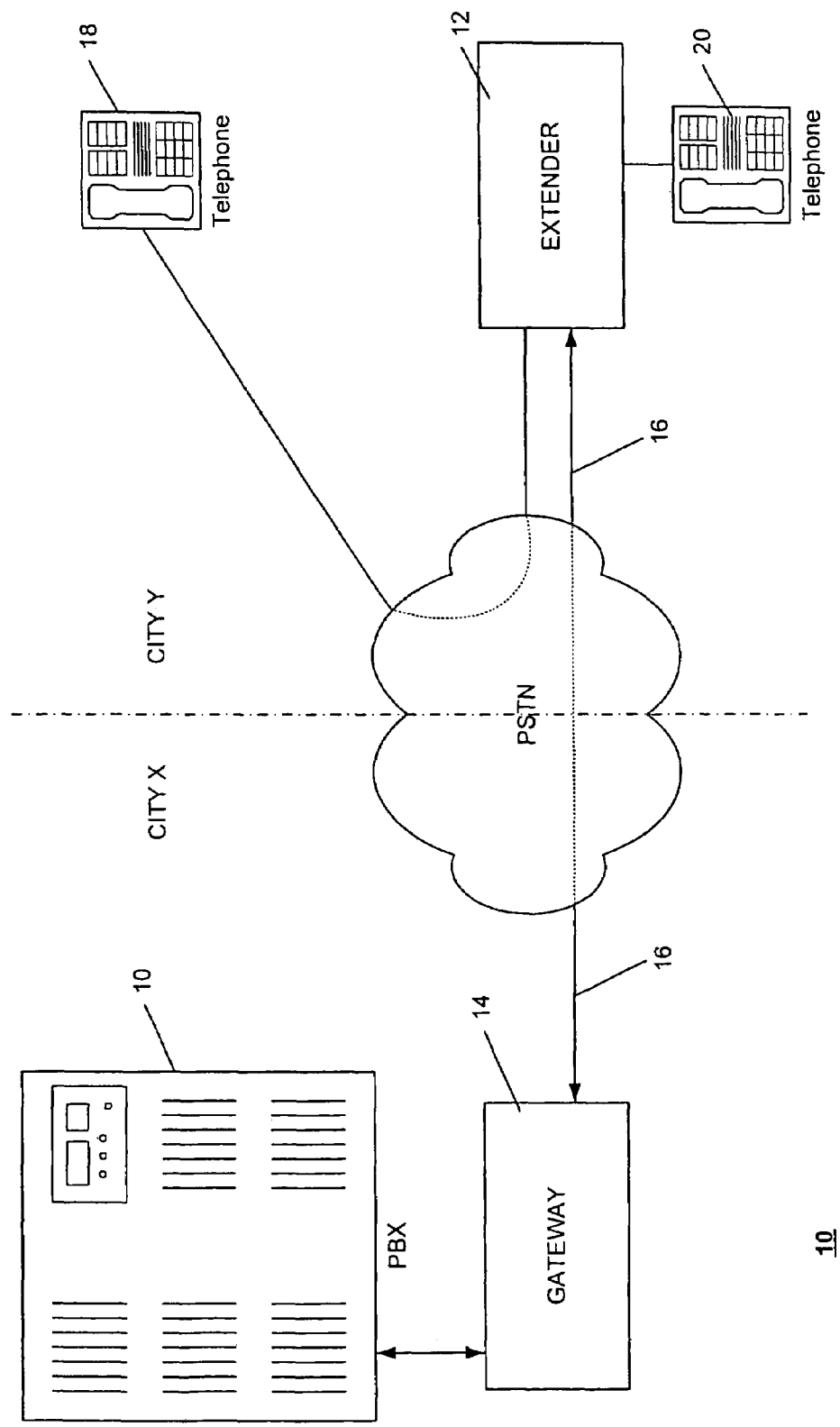
FIG. 1 shows a prior art system with a PBX switch in a central office in city X remotely connected to an extender in a different city Y.

The term "hair-pinning" refers to the voice traffic being diverted through the extender 112 without having to pass through the switching device 108 as with the prior art system shown in FIG. 1. In other embodiments, hairpinning as described herein may also occur via a KTS, a PBX or a gateway device. While hair-pinning is in effect, the users of the first phone 102 and the second phone 104 cannot take advantage of the functions and features of the switching device. In order to allow dynamic access to those functions and features, the processor 120 monitors the communications link 118 between the first phone 102 and the second phone 104 to determine if the functions and features provided by the switching device are required. If so, the processor configures the extender 112 to direct the voice traffic through the switching device via the extension link 116, thereby eliminating the hair-pinning, so that the voice traffic through the switching device 108 via the extension link 116. The processor 120 monitors the bandwidth available on the extension link 116 and only allows voice traffic to be transmitted on the extension link 116 if sufficient bandwidth is available.

During a normal hair-pinning operation, voice traffic flows directly between the two terminating phones, while the associated signaling data is routed through the switching device 108 via the extension link 116. If the signaling data is disrupted at any point along its path through the switching device 108, the processor 120 maintains the voice traffic between the two terminating phones. In some embodiments, the processor 120 provides notification of the disruption to the users of the two terminating phones, and further attempts to re-establish the signaling data path through the switching device 108. In other embodiments, the processor 120 may allow the voice traffic continue without signaling data until the voice traffic ends.

To support fast switching between ordinary (i.e., non-hair-pinned) voice routing and hairpinned voice routing, the processor 120 implements an effective bandwidth management scheme which divides traffic on the extension link 116 into two or more partitions, and groups the overall bandwidth in each partition into three distinct pools. The "free pool" tracks the amount of free bandwidth available in a particular partition. The "used pool" tracks the amount of bandwidth actually used in a particular partition. The "idle pool" tracks the amount of bandwidth allocated but not used in a partition due to the hair-pinning. This is a common bandwidth management scheme that applies to all types of wide area network (WAN) (e.g., T1, FT1, PRI, V.35/RS530/RS232 serial I/F) and IP links.

The hairpin path for the voice traffic is also referred to herein as the "least cost" path. Prior art PBX extenders required users to make external calls through the PBX switch on a trunk line local to the PBX switch. If the remote location is in a different calling area then the PBX switch, the user may incur toll charges to call phone number that would normally be local to the calling area. Hair-pinning avoids this result, thereby creating a least cost path. The least-cost voice path is dynamically changed to respond to features an extended user (i.e., one of the users connected through the extender 112) accesses. If a feature the extended user is accessing does not require a voice path back to the PBX switch, the voice path can be hair-pinned directly at the remote office site. All remote phones/PRI (Primary Rate Interface, e.g., T1) channels at the extended site can be used to initiate voice calls without using any voice bandwidth on the connection between the extended site (i.e., first region) and the main office (i.e., PBX site—second region). The voice quality on hair-pinned calls is significantly improved because the voice is directly connected, as compared to being packetized, compressed, echo cancelled and delayed in the extension link 116 to the PBX switch 108 and back.

The embodiment of FIG. 2 also provides a "Toll Bypass" feature by extending the trunk interface from the PBX switch 108 all the way to the remote site and interfacing, via the extending device 112, with the PRI that is local to the extending device 112. The PBX trunk interface is extended over extension link 116. Both remote phones (i.e., phones connected to the extender 112) and phones directly connected the PBX switch 108 have access to the Toll Bypass feature. Thus, a phone connected to the PBX switch 108 in region 2 can place a call to a PRI local to region 1 over the extension link 116, without incurring the long distance charges that would normally accrue if the call was made via the trunk interface in region 2.

Figure 3:
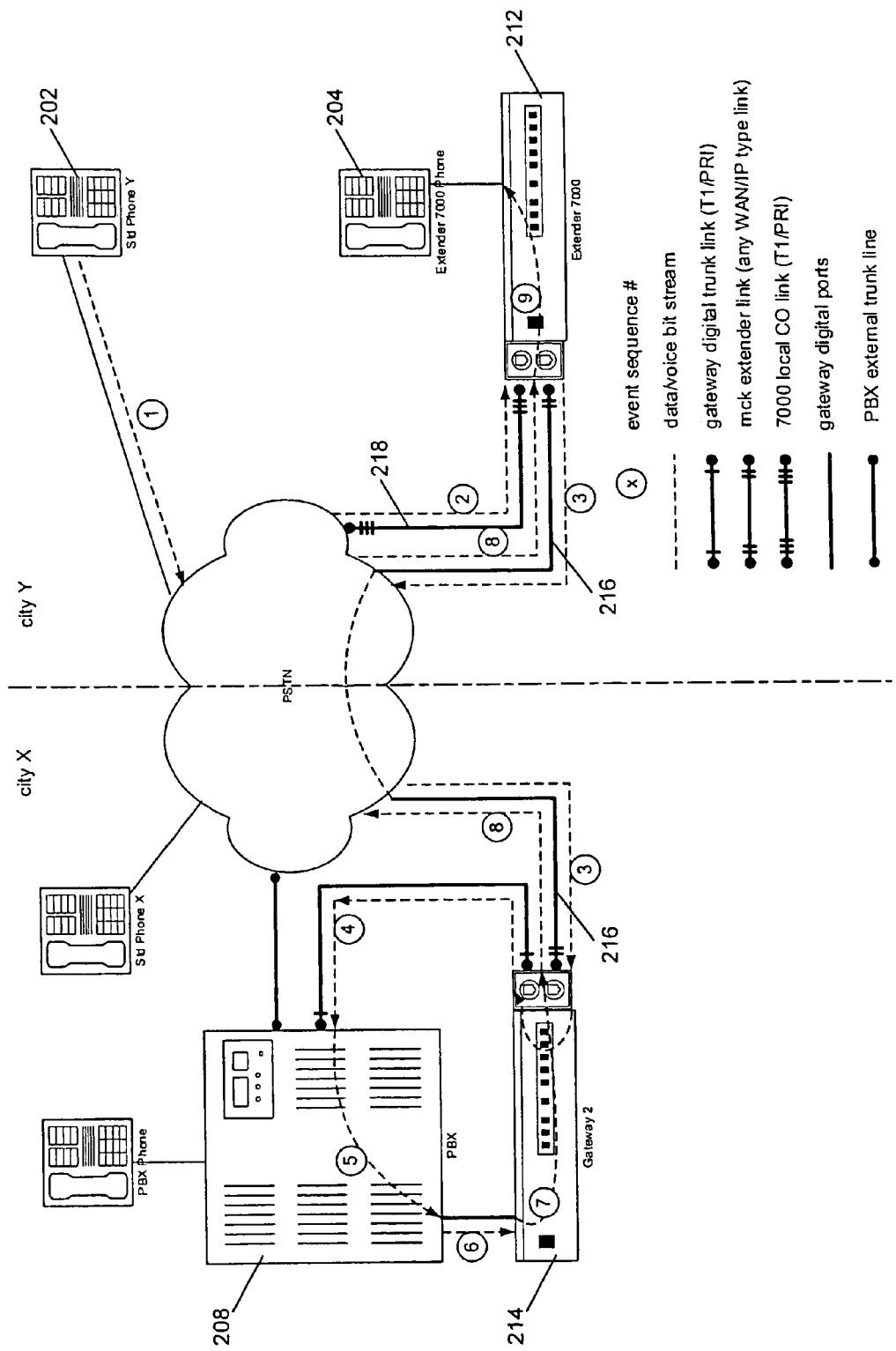
FIG. 3 shows a system similar to the one shown in FIG. 2, except with more specific components.

FIG. 3 shows a system similar to the system of FIG. 2, except with the extender device shown as an MCK Extender 7000, and the gateway is shown as an MCK Gateway 2. In FIG. 3, an outside caller at the first phone 202 calls the DID associated with the second phone 204 on an Extended Digital Port of the Extender 7000. The sequence of events are as follows:

1. Outside caller in city Y calls the DID on the 7000 local PRI associated with the Extended Digital Port.
2. The 7000 local central office (CO) PRI signals an incoming call.
3. Extender 7000 212 routes the call via MCK Extender Link 216 to the Gateway 2 214, reserving bandwidth for this call.
4. Gateway 2 routes the call via Gateway 2 T1/PRI (Trunk Interface) to the PBX PRI/T1 trunk interface.
5. The PBX 208 detects the incoming call and determines it is for the Digital port associated with the second phone 204.
6. The PBX 208 routes the call to the digital port connected to the Gateway 2 214.
7. The Gateway 2 214 routes the call to the Extender 7000 212 via the MCK Extender Link 216, reserving bandwidth for this call.
8. The Extender 7000 routes the call to the Extender 7000 phone.

Figure 4:
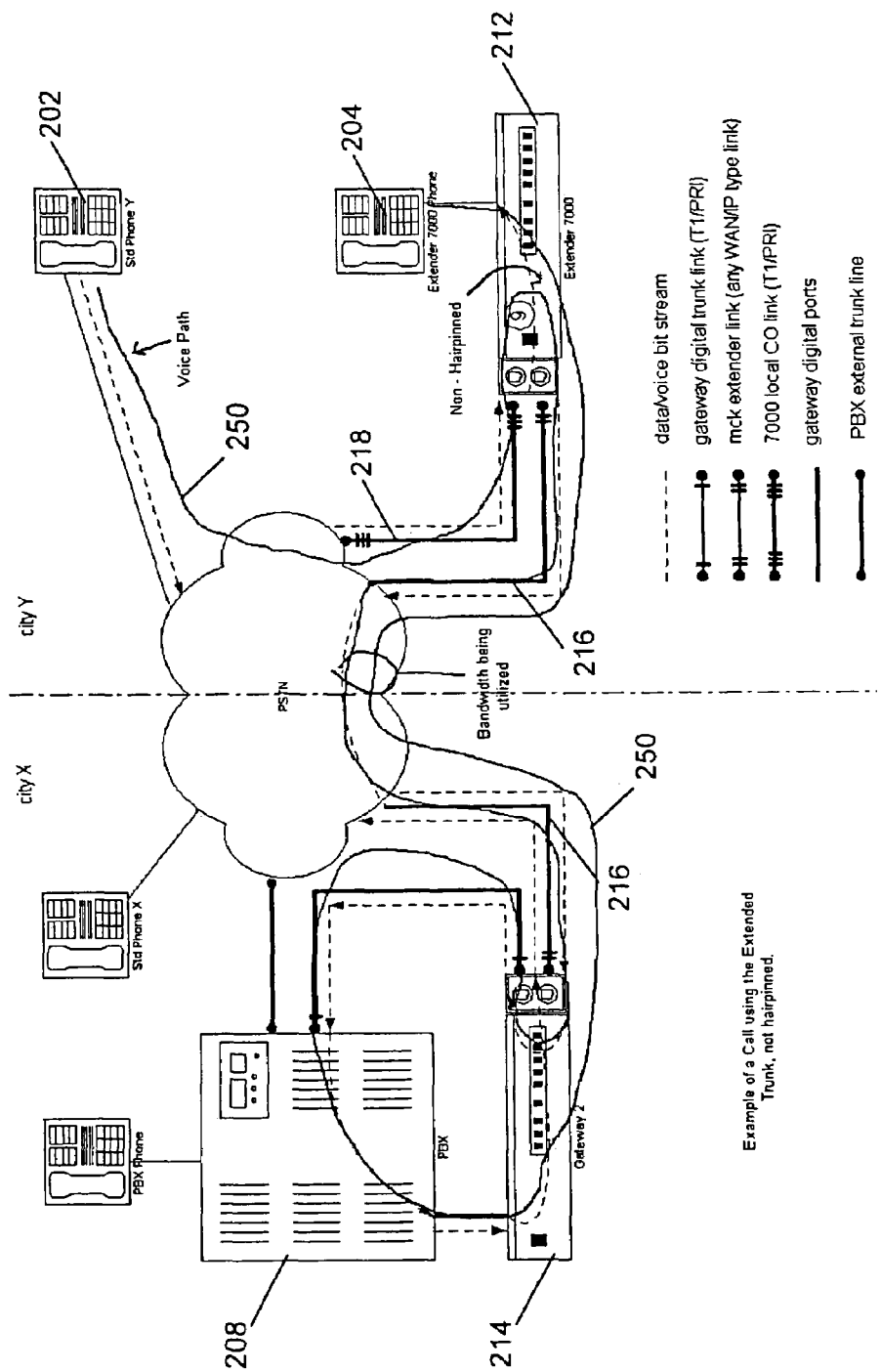
FIG. 4 shows the system of FIG. 3 without hair-pinning, with voice traffic shown explicitly.

FIG. 4 shows the system of FIG. 3 with the voice path 250 illustrated explicitly as:

Remote PRI→Extender 7000→Gateway 2→PBX→Gateway 2→Extender 7000→Extender 7000 Digital Phone.

Figure 5:
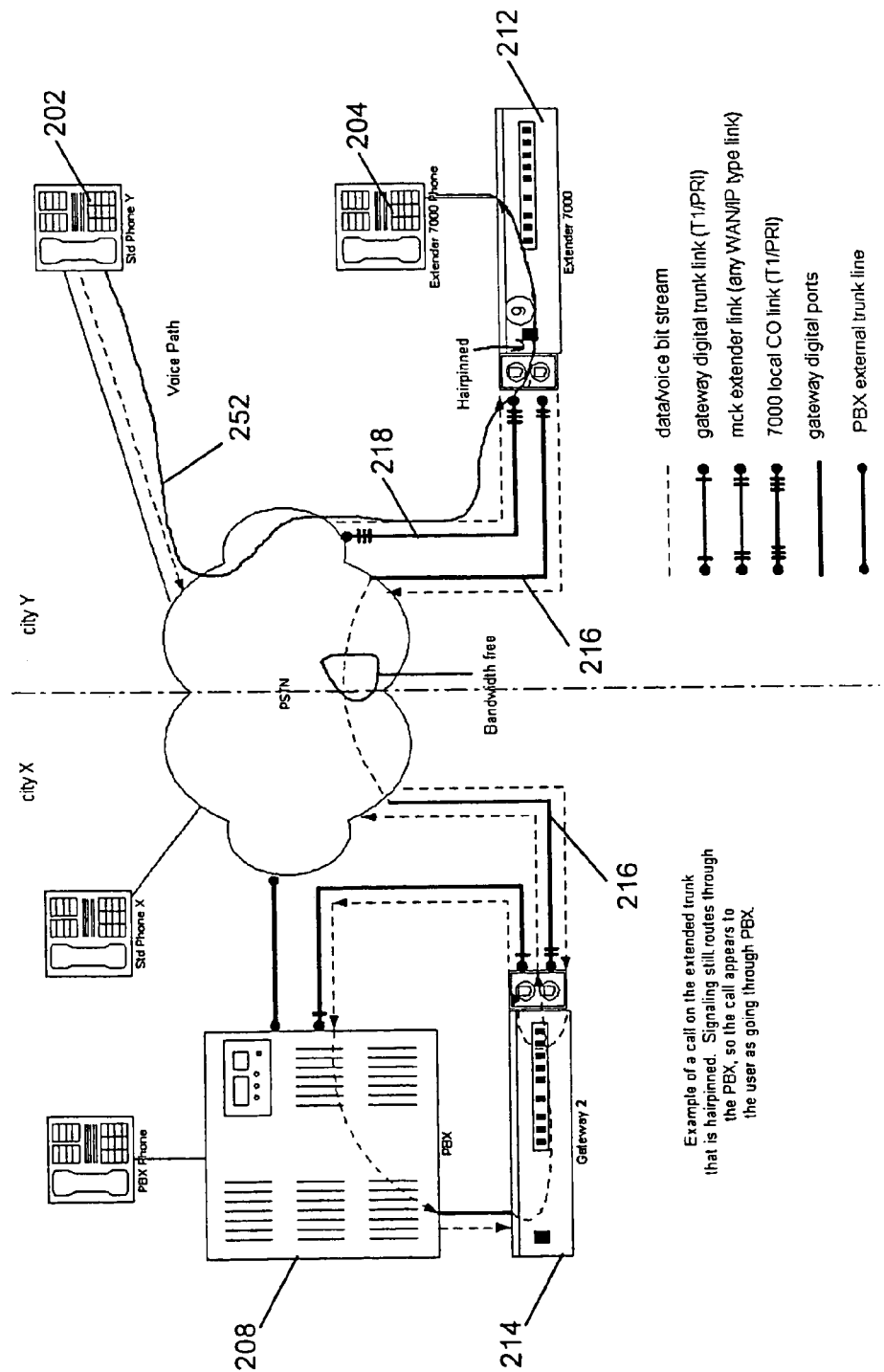
FIG. 5 shows the system of FIG. 3 with hair-pinning, with voice traffic shown explicitly; and, FIG. 6 shows a logical flow of the algorithm for finding a correct 1-1 mapping out of N local trunk calls and N switch calls.

The system detects the situation of FIG. 4 and performs hair-pinning, connecting the Remote PRI to the Extender 7000 digital phone. The voice connection that travels to the PBX 208 and back is removed from the extension link 216, and the bandwidth reserved for this connection is freed. The phone signaling still goes to the PBX 208 and back, just the voice connection is hair-pinned at the Extender 7000 212. This provides the effect of having a phone call through the PBX. FIG. 5 shows the system of FIG. 3 with the hairpinned voice path 252 shown explicitly.

The paths for a call from the first phone 202 to the second phone 204 is the same as for a call from the second phone 204 to the first phone 202.

Figure 6:
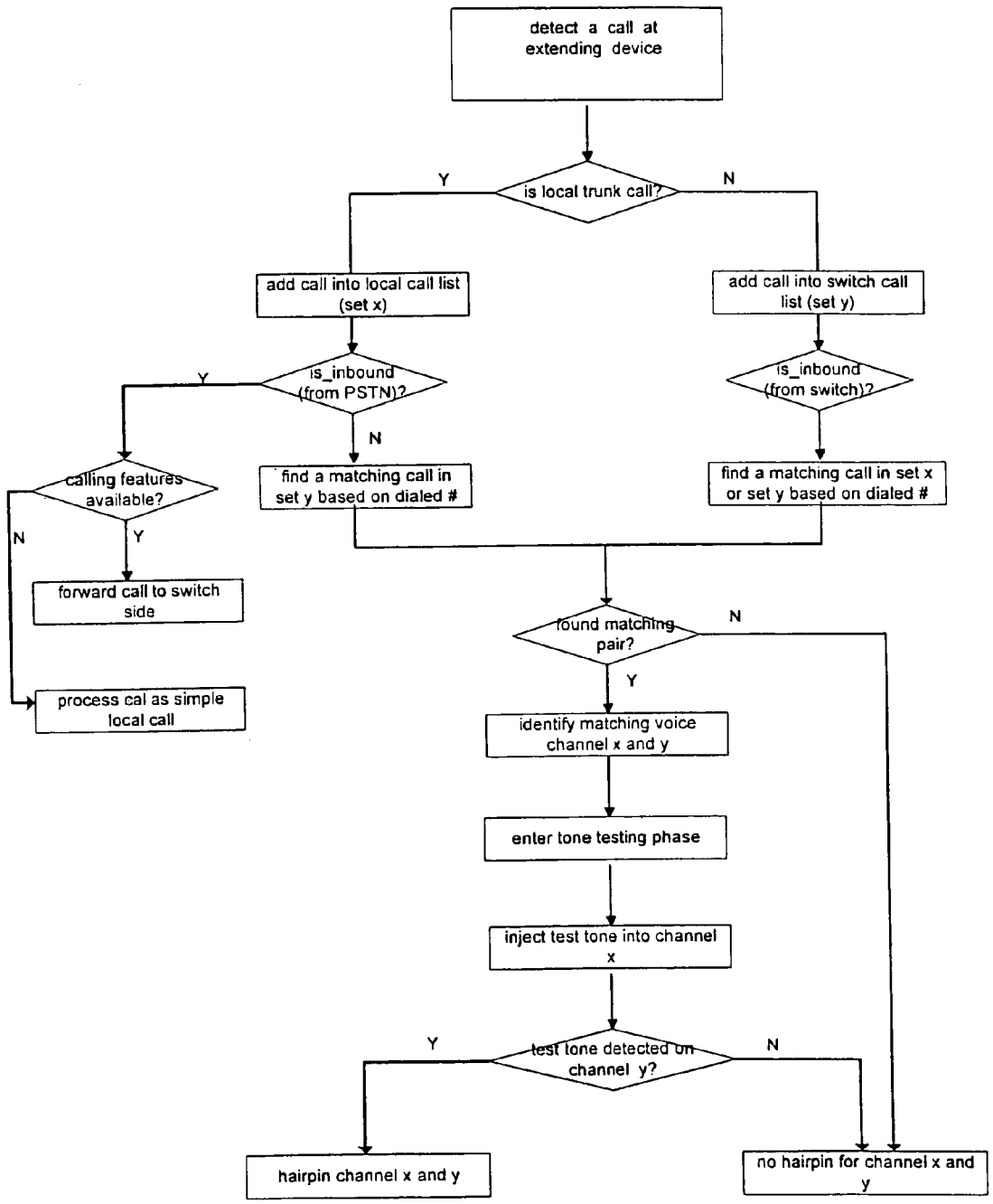

In one embodiment, the processor 120 implements a unique voice matching pair algorithm that determines whether the first phone and the second phone are a pair for the intended call. Refer to FIG. 6 for general description of the voice matching pair algorithm. The voice matching algorithm is universal, which works on PBX protocols. For an example of a typical problem for which the algorithm may be used to solve, suppose there are N inbound/outbound calls from/to the PSTN detected on a local trunk interface at the extending device, and there are another M inbound/outbound calls from/to the switch side detected on an extender interface. The voice matching pair algorithm described in FIG. 6 provides the correct 1-1 mapping out of N-M relationships so that the system can directly hairpin the voice path for this 1-1 pair at the extending device.

Another aspect of the invention is the Adaptive Frame Length Control (AFLC) mechanism used in packetizing/unpacketizing raw PCM voice stream process for improving audio quality. Basically, a QMC device (e.g., a Motorola QUICC multichannel controller) or other similar packetizing device is used to packetize raw PCM voice stream from T1/PRI/E1 interface, and then the host transmits the raw PCM voice packets to the other end of packetized network (e.g., IP). Another QMC device or other similar unpacketizing device on the other end of the network unpacketizes the packets into T1/PRI/E1 bit stream. This process is taken in both directions. In order to get good quality of voice via the packetizing/unpacketizing process, packet arrival rate from a packetizing device on one end has to be in synchronization with packet transmit rate to a unpacketizing device on the other end. If packet arrival rate from one end is faster than packet transmit rate on the other end, then there will be transmit overrun packet loss which will result into poor audio. If packet arrival rate from one end is slower than packet transmit rate on the other end, then there will be transmit under-run problem which will result in poor audio too. Unfortunately, normal voice packetizing scheme used for DSP will not work in this case and will have the mis-matched QMC packet arrival rate and packet transmit rate problem. The existing voice packetizing scheme will either require all packets to be transmitted with the same frame length or without frame boundary in transmitting. The fixed transmit frame length will result in packet loss due to transmit overrun. The reason why the fixed frame will have transmit overrun is that QMC or similar device will not be guaranteed to transmit frames of fixed length in a constant rate that is in sync with packet arrival rate due to T1/E1 frame sync delay in transmitting. Transmitting all packets without frame boundary will cause transmit packet under-run problem because the packet transmit rate will be faster than packet arrival rate, specifically with delay introduced in packetized network (e.g., IP).

The AFLC flow control mechanism overcomes the mismatched packet arrival and transmit rate problem by dynamically adjusting transmit frame boundary based on certain parameters such as the current transmit queue length, maximum transmit queue length, lower water-mark for turning on constant bit transmitting (i.e., transmit queued packets as a continuous bit stream without setting frame end flag), upper water-mark for turning off constant bit transmitting (i.e., end the current continuous bit stream with a frame end flag). By analyzing transmit queue length and other configurable parameters dynamically, the AFLC can predict whether the packet transmit rate is out of sync with packet arrival rate and the transmit rate shifts out in which direction (i.e., faster or slower than arrival rate). If it becomes faster, the AFLC will adjust frame boundary accordingly to slow down packet transmit rate to a sync point. If it becomes slower, the AFLC will adjust frame boundary accordingly to speed up packet transmit rate to a sync point. The AFLC will greatly improve audio quality because it virtually eliminates packet overrun and under-run problems. The AFLC can be used to improve not only audio quality but also other real-time applications such as video. The AFLC may be implemented in software running on a computer system, or it may be implemented in hardware (i.e., an application specific integrated circuit), or it may be implemented in a combination of software and hardware, such as a microcontroller system running on firmware, or any other similar technique known in the art of implementing such an algorithm.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. In a system having a switching device in a first location, and an extending device in a second location, wherein the extending device extends functionality of the switching device to the second location, a method of providing a communications link between (i) a first phone associated with the extending device and (ii) a PSTN trunk port, the method comprising:
    analyzing parameters associated with the first phone and the PSTN trunk port so as to determine that the first phone and the PSTN trunk port are local to the second location and are a pair for the intended call;
    separating signaling data associated with the communications link from voice traffic associated with the communications link;
    directing the signaling data through the switching device via an extension link between the switching device and the extending device;
    directing the voice traffic between the first phone and the PSTN trunk port;
    analyzing the parameters associated with the first phone and the PSTN trunk port with a voice matching pair algorithm, so as to determine that the first phone and the PSTN trunk port are a pair for the intended call; and
    managing bandwidth within the extension link between the switching device and the extending device by dividing the extension link bandwidth into distinct partitions.

2. A method according to claim 1, further including monitoring the communications link to determine if one or more features provided by the switching device are required, and directing the voice traffic through the switching device if the features provided by the switching device are required.

3. A method according to claim 2, further including monitoring bandwidth available in the communications link, and preventing the voice traffic from being directed to the switching device if an amount of available bandwidth in the communications link is below a predetermined value.

4. A method according to claim 1, further including maintaining the voice traffic between the first phone and the PSTN trunk port if the signaling data through the switching device is disrupted.

5. A method according to claim 1, further including dividing each of the distinct partitions into three distinct pools, including (i) a free pool characterized an amount of free bandwidth available in the partition, (ii) a used pool characterized by an amount of bandwidth actually used in the partition, and (iii) an idle pool characterized by an amount of bandwidth allocated but not used within the partition.

6. A method according to claim 1, further including dynamically determining a least-cost path for the voice traffic, and selectively directing the voice traffic to the least-cost path.

7. A method according to claim 1, further including providing a trunk interface extension from the switching device to the extending device such that either (i) the first phone, (ii) a third phone associated with the switching device, or (iii) both the first and third phone use the trunk interface extension to place a call to the PSTN trunk port.

8. A method according to claim 1, further including providing a trunk interface extension from the switching device to the extending device such that either (i) the first phone, (ii) a third phone associated with the switching device, or (iii) both the first phone and the third phone use the trunk interface extension to receive a call from the PSTN trunk port.

9. A system for hair-pinning voice traffic from a first phone to a second phone within a first region over a communications link via an extending device in the first region, wherein the extending device extends functionality of a switching device in a second region, the system comprising:
    a processor for analyzing parameters associated with the first phone and the second phone so as to determine that the first phone and the second phone are local to the second location, wherein the processor is configured and arranged to analyze the parameters associated with the first phone and the PSTN trunk port with a voice matching pair algorithm, so as to determine that the first phone and the PSTN trunk port are a pair for the intended call, wherein the processor manages bandwidth within the extension link between the switching device and the extending device by dividing the extension link bandwidth into distinct partitions;
    a splitter for separating signaling data associated with the communications link from voice traffic associated with the communications link; and
    a multiplexor for directing the signaling data through the switching device via an extension link between the switching device and the extending device, and directing the voice traffic between the first phone and the second phone.

10. A system according to claim 9, wherein the processor monitors the communications link to determine if one or more features provided by the switching device are required, and directs the voice traffic through the switching device if the features provided by the switching device are required.

11. A system according to claim 10, wherein the processor monitors bandwidth available in the communications link, and prevents the voice traffic from being directed to the switching device if an amount of available bandwidth in the communications link is below a predetermined value.

12. A system according to claim 9, wherein the processor maintains the voice traffic between the first phone and the second phone if the signaling data through the switching device is disrupted.

13. A system according to claim 9, wherein the processor divides each of the distinct partitions into three distinct pools, including (i) a free pool characterized an amount of free bandwidth available in the partition, (ii) a used pool characterized by an amount of bandwidth actually used in the partition, and (iii) an idle pool characterized by an amount of bandwidth allocated but not used within the partition.

14. A system according to claim 9, wherein the processor dynamically determines a least-cost path for the voice traffic, and selectively directs the voice traffic to the least-cost path.

15. A system according to claim 9, further including a trunk interface extension from the switching device to the extending device wherein either (i) the first phone, (ii) a third phone associated with the switching device, or (iii) both the first and third phone uses the trunk interface extension to place a call to the second phone.

16. A system according to claim 9, further including a trunk interface extension from the switching device to the extending device wherein either (i) the first phone, (ii) a third phone associated with the switching device, or (iii) both the first phone and the third phone uses the trunk interface extension to receive a call from the second phone.

17. A system according to claim 9, further including means for mitigating mismatched packet transmit and receive rates associated with a packet flow.

18. A system according to claim 17, wherein the means for mitigating mismatched packet transmit and receive rates includes a flow control mechanism.

19. A system according to claim 18, wherein the flow control mechanism (i) gathers one or more parameters associated with the packet flow, and (ii) adjusts a transmit frame boundary so as to dynamically vary the transmit rate to substantially match the arrival rate.

20. A system according to claim 19, wherein the one or more parameters associated with the packet flow is selected from the group consisting of (i) current transmit queue length, (ii) maximum transmit queue length, (iii) lower water-mark for turning on constant bit transmitting, (iv) upper water-mark for turning off constant bit transmitting, and combinations thereof.

21. A system for transmitting voice traffic from a first phone within a first region to a PSTN trunk port within the first region via a communications link, the system comprising:
a switching device resident in a second region remote from the first region, wherein the switching device provides one or more communications features related to telephone communications; and
an extending device resident in the first region, local to and electrically coupled to the first phone, wherein the extending device communicates with the switching device via an extension link and extends functionality of the switching device such that the communications features are available in the first region;
wherein the extending device (i) analyzes parameters associated with the first phone and the PSTN trunk port so as to determine that the first phone and the PSTN trunk port are local to the second location, (ii) separates signaling data associated with the communications link from voice traffic associated with the communications link, (iii) directs the signaling data through the switching device via an extension link between the switching device and the extending device, and (iv) directs the voice traffic between the first phone and the PSTN trunk port, and (v) manages bandwidth within the extension link between the switching device and the extending device by dividing the extension link bandwidth into distinct partitions, and wherein the extending device is configured and arranged to analyze the parameters associated with the first phone and the PSTN trunk port with a voice matching pair algorithm, so as to determine that the first phone and the PSTN trunk port are a pair for the intended call.

22. A system according to claim 21, wherein the switching device includes a PBX switching system.

23. A system according to claim 21, wherein the extension link includes one or more communications channels through the public switch telephone network.

24. A system according to claim 21, wherein the one or more communications features includes PBX functions and features.

25. A system according to claim 24, wherein the PBX functions and features include call forwarding, call waiting, voicemail, call transfer, conferencing or combinations thereof.

26. A system according to claim 9, further comprising a flow control mechanism for mitigating mismatched packet transmit and receive rates associated with a packet flow at a PRI, comprising:
means for gathering one or more parameters associated with the packet flow, and
means for adjusting a transmit frame boundary so as to dynamically vary the transmit rate to substantially match the arrival rate.

27. A system according to claim 26, wherein the one or more parameters associated with the packet flow is selected from the group consisting of (i) current transmit queue length, (ii) maximum transmit queue length, (iii) lower water-mark for turning on constant bit transmitting, (iv) upper water-mark for turning off constant bit transmitting, and combinations thereof.

28. A method according to claim 1, further comprising:
mitigating mismatched packet transmit and receive rates associated with a packet flow at a PRI, comprising;
gathering one or more parameters associated with the packet flow, and,
adjusting a transmit frame boundary so as to dynamically vary the transmit rate to substantially match the arrival rate.

* * * * *

UNITED STATES PATENT AND TRADEMARK OFFICE
CERTIFICATE OF CORRECTION

PATENT NO. : 7,657,019 B2
APPLICATION NO. : 10/199178
DATED : February 2, 2010
INVENTOR(S) : Zhang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1231 days.

Signed and Sealed this

Thirtieth Day of November, 2010

David J. Kappos
*Director of the United States Patent and Trademark Office*